Sept. 4, 1962　　　　　H. K. PELZER　　　　　3,052,364
LOADING ARRANGEMENT FOR SUCCESSIVELY AND IN A CONTINUOUS
MANNER LOADING A PLURALITY OF COMPARTMENTS
Filed Feb. 10, 1960　　　　　　　　　　　　　　　2 Sheets-Sheet 1

Sept. 4, 1962  H. K. PELZER  3,052,364
LOADING ARRANGEMENT FOR SUCCESSIVELY AND IN A CONTINUOUS
MANNER LOADING A PLURALITY OF COMPARTMENTS
Filed Feb. 10, 1960  2 Sheets-Sheet 2
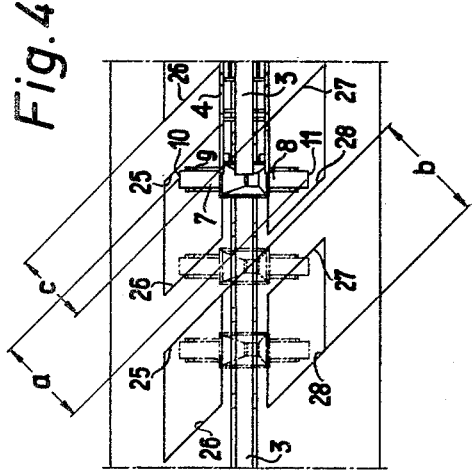
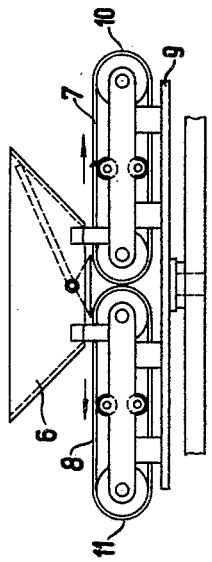
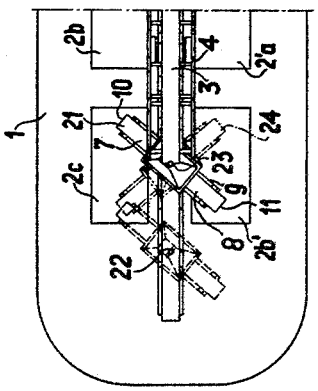
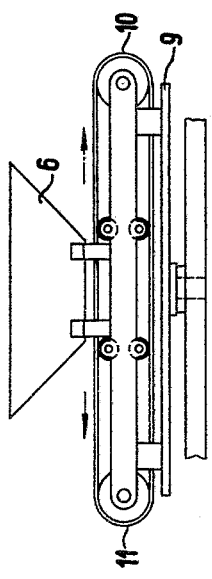

United States Patent Office 3,052,364
Patented Sept. 4, 1962

3,052,364
LOADING ARRANGEMENT FOR SUCCESSIVELY AND IN A CONTINUOUS MANNER LOADING A PLURALITY OF COMPARTMENTS
Hans K. Pelzer, Krefeld, Germany, assignor to Beteiligungs- und Patentverwaltungsgesellschaft mit beschränkter Haftung, Essen, Germany
Filed Feb. 10, 1960, Ser. No. 7,852
Claims priority, application Germany Feb. 14, 1959
1 Claim. (Cl. 214—16)

The present invention relates to an arrangement for loading storage chambers through openings spaced from each other and arranged one behind the other, for instance in ships.

It is an object of this invention to provide an arrangement of the above mentioned general type, which will make it possible by the employment of simple means to load such storage chambers in an uninterrupted manner.

It is an other object of this invention to provide a loading arrangement for loading pourable goods in an uninterrupted manner into hatches of ships which making it possible to start the loading at one end of the ship and finish the loading at the other end of the ship.

These and other objects and advantages of the invention will appear more clearly from the following specification in connection with the accompanying drawings, in which:

FIG. 3 is a top view of a portion of the ship with the loading arrangement of FIG. 1, but with the loading arrangement moved into a different position.

FIG. 4 illustrates a top view of a ship with a modified loading arrangement and a modified opening of the hatches.

FIG. 5 shows on a somewhat larger scale than that of FIGS. 1 and 2 a side view of a dumping device employed with the arrangement of FIG. 1.

FIG. 6 is a side view of a dumping device somewhat modified over that of FIG. 5.

*General Arrangement*

The loading arrangement according to the present invention is characterized primarily in that between the rows of the hatch openings through which the goods are passed into the hatches, there is provided a conveyor system with a dumping carriage equipped with two dumping stations alternately receiving and discharging the goods to be loaded. The arrangement is such that one dumping station is movable over one row of hatch openings, whereas the other dumping station is movable over the other row of hatch openings. The connecting line between the two dumping stations forms with the edges of the hatch openings over which the dumping stations move an angle, and when looking in the direction of movement of the dumping carriage, the front edge of a hatch opening is offset with regard to the rear edge of a hatch opening on the other side of the conveyor belt in such a way that the dumping device has one of its dumping stations over one hatch opening before the other dumping station leaves the adjacent hatch opening on the other side of the conveyor.

If the hatch openings are arranged symmetrically with regard to the longitudinal axis of the conveyor, the dumping device is advantageously equipped with a straight arm which comprises the dumping stations and forms with the longitudinal axis of the conveyor an angle different from 90°. The projection of said arm upon the direction of the conveyor is greater than the distance between the edges of two hatch openings over which said dumping stations pass and is less than the length of the hatch openings.

*Structural Arrangement*

Figure 1:
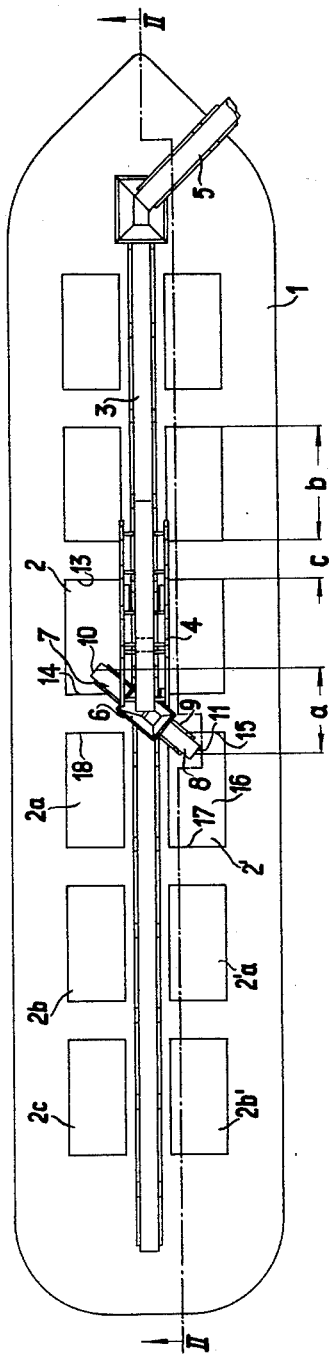
FIG. 1 shows a top view of a ship being loaded by a loading arrangement according to the invention.
Figure 2:
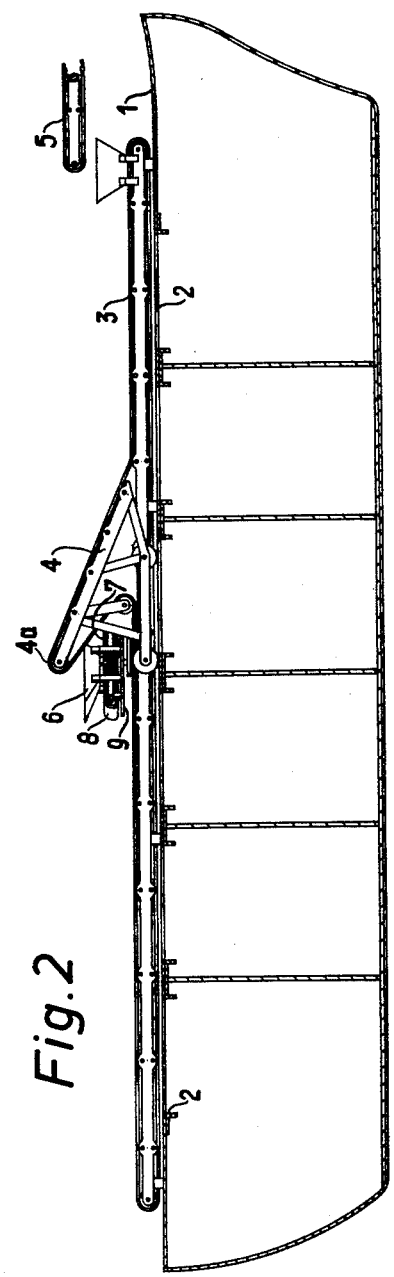
FIG. 2 is a section taken along the line II—II of FIG. 1.

Referring now to the drawings in detail and FIGS. 1 to 3 thereof in particular, these figures show a ship the upper deck 1 of which is provided with two rows of rectangular hatches 2, 2a, 2b, etc. (first row) and 2′, 2a′, 2b′, etc. (second row). Arranged between said two rows is a conveyor belt 3 with a dumping carriage 4 which is passed over by the upper or taut belt portion in form of a loop. Belt 3 is loaded at one end of the ship by a feeder conveyor 5. Below the drum 4a of the carriage 4 the latter carries a two-branch chute 6 by means of which the goods to be loaded may selectively be charged onto one of the conveyor belts 7, 8 respectively moving in opposite directions. These belts are carried by an overhang beam or arm 9 forming an angle of approximately 45° with the longitudinal direction of conveyor belt 3. The dumping ends 10, 11 of belts 7 and 8 respectively are mounted at opposite sides of the conveyor belt 3.

It may be assumed that hatch 2 is to be loaded with pourable goods. During the charging of hatch 2, the dumping carriage 4 may be moved from the right-hand side to the left-hand side (with regard to FIG. 1) to such an extent that the dumping end 10 of belt 7 will move between the edges 13 and 14 of hatch 2 which are located perpendicular to the longitudinal direction of the conveyor belt 3. When carriage 4 has reached the position shown in FIG. 1, i.e. shortly before end 10 has reached the left-hand edge 14 of hatch 2, the dumping end 11 of belt 8 passes over the right-hand edge 15 of hatch 2′ which is located on the opposite side of belt 3. If in this position of the carriage 4 the flap 4b has been tilted over to the left-hand side of FIG. 5, the loading occurs onto belt 7, which means that the goods on conveyor belt 3 will be loaded into hatch 2. By adjusting the two-branch chute so that the branch over belt 8 will discharge, i.e. by tilting flap 4b into its FIG. 5 position, goods will be loaded by belt 8 into hatch 2′. At this time, the other branch of the two-branch chute will be closed. Before, during the further movement of dumping carriage 4 toward the left, the dumping end 11 of belt 8 has reached the left-hand edge 17 of hatch 2′, the dumping end 10 of belt 7 will have passed over the right-hand edge 18 of hatch 2a located opposite hatch 2′. By again flipping over the discharging control flap in the two-branch chute so as to adjust the chute for charging belt 7, the loading of hatch 2a can be started before the discharge end 11 of belt 8 has passed over the left-hand edge 17 of hatch 2′.

From FIG. 1 it will be evident that in order to be able successively to charge all hatches without interruption, it is necessary that the projection a of the connecting line between the dumping ends 10 and 11 upon the line of direction of the conveyor belt 3 is shorter than the length b of a hatch and is greater than the distance c between two adjacent hatches of one and the same row. It is, of course, assumed that the hatches are arranged symmetrically with regard to the conveyor belt 3.

If the dumping carriage 4 is intended to load hatch 2c located at the left-hand end of the upper row of hatches of FIG. 1, carriage 4 has to be advanced to such an extent that the belts 7, 8 occupy the position indicated in FIG. 3 with the reference numeral 21. In order to allow the discharge end 10 of belt 7 to move over the entire length of hatch 2c, the dumping carriage 4 must be moved to such an extent that the central portion of the two-branch chute will be located at approximately the point 22 in FIG. 3. However, the movement of the dumping carriage 4 toward the left to the just mentioned extent may be avoided if the arm 9 is turned about the central axis 23 of chute 6 to such an extent that it occupies the position designated with the reference numeral 24 in FIG. 3. If the arm 9 may thus be turned, the hatches can successively be loaded by corresponding movement of dump carriage 4 toward the right with regard to the drawings.

It should be noted that it is not under all circumstances necessary that the hatches are located symmetrically with regard to belt 3 as shown in FIG. 1. It is also possible to have the hatches of one row offset with regard to the hatches of the other row. Furthermore, it is not necessary that the hatches of one row have the same length as the hatches of the other row.

It is also possible that the arm 9 of the distributing belts 7 and 8 forms a rectangle with the longitudinal direction of the conveyor belt 3 as shown in FIG. 4, provided that the edges 25, 26, 27, 28 to be passed over by the dumping ends 10 and 11 form a corresponding angle with the longitudinal direction of belt 3, i.e. an angle correspondingly deviating from 90°. At any rate, it is necessary that the distance $a$ is less than the distance $b$ and greater than the distance $c$. The letter $a$ always designates the length of the line obtained when the connecting line between the discharge ends 10 and 11 is projected upon a line perpendicular to the hatch edges over which the dumping ends pass. The letters $b$ and $c$ designate the distances by which, when looking in the direction of movement of the dumping carriage 4, a front edge of one hatch is spaced from the rear edge of a hatch on the other side of the conveyor belt 3. More specifically, with regard to the distance $b$, the distance is meant between two opposite but remote edges, for instance 25 and 28 in FIG. 3, of adjacent hatches located on opposite sides of belt 3. With regard to the distance $c$, the distance is meant between two opposite but adjacent edges, as for instance 26 and 27, respectively pertaining to two hatches on opposite sides of the conveyor belt 3.

It is furthermore to be noted that the hatches instead of being of rectangular shape as shown in FIG. 1 may also have the shape of a parallelogram according to FIG. 4 or any other convenient shape, as for instance a trapezoidal shape.

Instead of employing a conveyor belt 3, also any other convenient conveying means may be used. The distribution of the goods to be loaded from the conveyor carriage to both sides of the conveyor belt may be carried out not only in the manner shown in FIG. 5, but also by other distributing devices. Thus, for instance, is it possible to employ a single discharging belt on arm 9 and to make the direction of movement of this belt reversible as shown in FIG. 6.

It is, of course, to be understood that the present invention is, by no means, limited to the particular constructions shown in the drawings but also comprises any modifications within the scope of the appended claim.

What I claim is:

In a loading arrangement for successively and in a continuous manner loading a plurality of compartments each of which has at least one loading opening, said loading openings forming two substantially parallel rows of openings spaced from each other in the longitudinal direction of said rows and in the direction transverse to said longitudinal direction, conveyor means located between said two rows of openings at a fixed distance thereto in a direction transverse to said rows, said conveyor means extending in the longitudinal direction of said rows for receiving goods to be loaded into said compartments, said loading openings being arranged in fixed location relative to said conveyor means and symmetrically with regard thereto on opposite sides thereof, a dumping device associated with said conveyor means and movable between said two rows, said dumping device having two dumping stations adapted alternately to receive goods from said conveyor means and alternately to dump same through a loading opening of one row and a loading opening of the other row while moving in the longitudinal direction of said rows to thereby successively load said compartments, one of said dumping stations always being at a level higher than the openings of one of said rows and the other dumping station always being at a level higher than the opening of the other one of said rows, said dumping device including an arm forming with the longitudinal direction of said conveyor means an angle differing from 90°, the projection of said arm onto the longitudinal direction of said conveyor means being in excess of the distance between two successive loading openings respectively located on opposite sides of said conveyor means, said projection being less than the length of each loading opening.

References Cited in the file of this patent

UNITED STATES PATENTS

| 1,204,203 | Stuart | Nov. 7, 1916 |
| 1,403,921 | Stuart | Jan. 17, 1922 |
| 1,629,991 | Budd et al. | May 24, 1927 |
| 1,940,488 | Crowells | Dec. 19, 1933 |

FOREIGN PATENTS

| 668,328 | Germany | Nov. 30, 1938 |